Jan. 14, 1941.  A. K. FOULDS  2,228,515
CONTROL DEVICE
Filed Dec. 16, 1936

INVENTOR
Andrew K. Foulds

Patented Jan. 14, 1941

2,228,515

UNITED STATES PATENT OFFICE 2,228,515

CONTROL DEVICE

Andrew K. Foulds, Grosse Pointe Park, Mich., assignor to Detroit Lubricator Company, Detroit, Mich., a corporation of Michigan Application December 16, 1936, Serial No. 116,085

16 Claims. (Cl. 236—68)

My invention relates generally to control systems and more particularly to control systems for fuel stokers of heating systems.

One of the objects of my invention is to provide a new and improved control system for controlling the operation of a motor such that under certain conditions the motor will operate for time periods of relatively long duration, and under certain other conditions will operate for time periods of relatively short duration.

Another object of my invention is to provide a new and improved thermostat having novel means for periodically opening and closing the circuit of a motor.

Another object of my invention is to provide a new and improved control including a heat motor for controlling operation of an electric motor, and having novel means for controlling the heat motor to determine the time interval of operation of the electric motor.

Another object of my invention is to provide a thermostat having a temperature responsive means for controlling the circuit of a motor and one which will intermittently make and break the circuit of the motor when the temperature of the temperature responsive means is above a predetermined temperature.

Another object of my invention is to provide a control device of the above-mentioned character which will be efficient in operation and yet one which will be inexpensive to manufacture.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1:
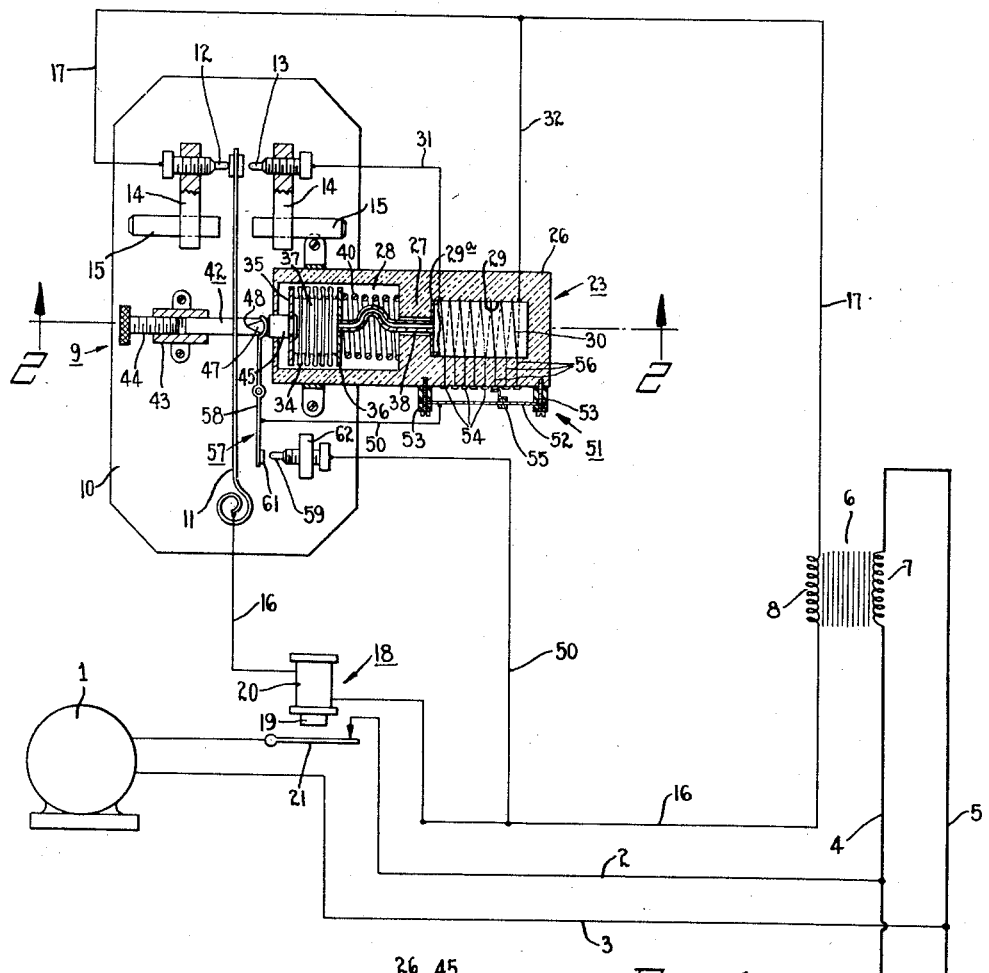
Figure 1 is a diagrammatic view of a control system embodying my invention.

Referring to the drawing by characters of reference the numeral 1 designates in general a motor, preferably an electric motor which, among other uses, may be employed to drive a fuel stoker (not shown) of a heating apparatus. The motor 1 is connected by lead wires 2 and 3 to main lead wires 4 and 5 respectively, which may lead from the usual 110v line. The main lead wires 4 and 5 lead to a transformer 6 having the usual primary coil 7 and secondary coil 8, the main lead wires being connected to the transformer primary 7 in the usual manner.

My control device, designated in general by the numeral 9, is connected in circuit with the transformer secondary 8 and controls the operation of the motor 1. The control device 9 may be located in a room or other enclosed space, the temperature or condition of the air of which is to be controlled, and the control device may include a supporting member or base 10 on which there may be mounted a suitable element 11 responsive to the condition of the ambient air. In the present instance the condition responsive element 11 is a thermostatic or bimetallic blade. The blade 11 may be secured adjacent one end thereof to and adjacent the lower end of the base 10, and extending upward preferably has its upper or free end positioned for movement between two spaced, substantially aligned contact members 12 and 13. The contact members 12, 13 are preferably screws, adjustably screw threaded into supporting members or brackets 14 that may be rigidly secured to the base 10, which base is preferably formed of a good electric insulating material. Carried or supported by each of the brackets 14 below the contact members 12, 13 there is a magnet 15 preferably of the so-called permanent bar type, these magnets preferably being arranged with their positive poles in spaced, opposed relation and disposed toward opposite sides of the blade 11. The magnets 15 move blade 11 with a snap action when the blade moves within the range of effective attractive force of one or the other of the magnets, and serve to hold the blade in positive engagement with one or the other of the contact members 12, 13 to prevent sparking at the contacts.

The blade 11 is connected by a lead wire 16 to the transformer secondary 8 and the contact member 12 is also connected to the transformer secondary by a lead wire 17. A relay 18 controls the circuit of the motor 1 and in turn is controlled by the thermostat. The relay 18 may be of the conventional type having a core 19 surrounded by a coil 20 and having a movable armature 21 serving as a switch. The coil 20 is connected in the thermostat lead wire 16 and the switch 21 is located in the lead wire 2 of the electric motor 1. When the thermostatic blade 11 becomes dissatisfied, that is, calls for heat or for other changes in the air of a room, the blade 11 will make contact with the contact member 12 which will close the circuit of the relay 18 causing switch 21 to close the circuit of the motor 1. The motor 1 will then operate until such time as the blade 11 is again satisfied, or until the desired condition of the air of a room has been reached, causing the blade 11 to move out of engagement with the contact member 12 and open the circuit of the motor 1.

As is well known, in certain systems such as, for example, in heating systems having fuel stokers, it is desirable that the stoker be operated at regular time intervals and for a predetermined time period, even though the thermostat is satisfied, so as to prevent the fire or temperature of the heating fluid from becoming too low. In my thermostat, when the blade 11 is satisfied or is heated to a predetermined temperature, it will engage contact member 13 closing the circuit of the relay 18 which in turn will close the circuit of the motor 1. To prevent undue or excessive supply of heat to a room or other enclosed space when the thermostatic blade 11 is satisfied and engages contact member 13, I provide for the motor 1 to be operated at relatively short time intervals as compared to the time interval of operation of the motor when blade 11 engages contact member 12, and to this end I employ a heat motor 23 for periodically moving blade 11 out of engagement with contact 13 to thereby periodically open the circuit of the motor 1.

The heat motor 23 may be mounted on the thermostat base 10 below the contact member 13, on the opposite side of the blade 11 from the contact member 12. The heat motor includes a casing 26 that is preferably of elongated form arranged with one end disposed toward the blade 11, and this casing is also preferably formed of a good heat and electric insulating material. The casing 26 has an internal wall 27 that preferably extends substantially parallel with the casing end walls and divides the interior of the casing into two chambers 28 and 29. The chamber 29, which may be termed the outer chamber, preferably has a metallic liner 29ª forming a bulb element, and surrounding or wrapped around the liner or bulb element 29ª there is a coil of resistance wire 30 for generating heat. One end of the coil 30 is connected to the contact member 13 by a lead wire 31 and a tapped coil intermediate the ends thereof is connected to the transformer secondary 8 by lead wire 32 that is shown connected to the lead wire 17. The coil 30 may be so arranged that the portion thereof in series circuit with the contact 13 be of sufficiently low resistance and current carrying capacity that the drop in voltage therethrough is not of sufficient magnitude to prevent operation of the relay 20.

Positioned in the other chamber 28, which may be termed the inner chamber, there is a pressure responsive means, preferably a metallic bellows member 34. The bellows member 34 is arranged to expand and contract longitudinally of the casing 26 and has its opposite ends closed by and hermetically sealed to movable end walls or plate members 35 and 36 that cooperate with the bellows to provide a closed expansible chamber 37. The bellows expansible chamber 37 is communicatively connected to the heating coil chamber 29 by a flexible tube or conduit 38 that extends through an aperture in the internal wall 27 and has one end hermetically secured and sealed in an aperture in the metallic liner 29ª. The other end of the conduit 38 is secured in an aperture of and hermetically sealed to the rear end wall or plate 36 of the bellows member 34 so that the bellows member, conduit 38 and element 29ª provide a sealed enclosure that contains or is charged with a suitable volatile, expansible-contractible fluid. Within the bellows chamber 28 there is preferably a helical coil spring 40 that surrounds the flexible conduit 38 and has one end abutting the internal wall 27 and the other end abutting the opposed bellows end wall 36. The spring 40 is under compression and prevents outward movement of the bellows end wall 36 at fluid pressures below a predetermined pressure. In the event that the pressure of the fluid in the bellows 34 becomes excessive, as may occur for example in summer, the spring 40 will be overcome and the bellows end wall 36 will be moved outward toward wall 27 permitting expansion of chamber 37 to prevent undue increase of internal fluid pressure which might otherwise rupture the bellows.

Figure 2:
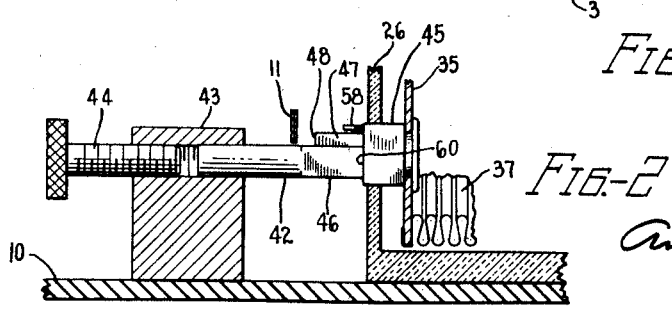
Fig. 2 is an enlarged view showing certain details of construction of my improved thermostat and taken along the line 2—2 of Fig. 1.

Carried by the bellows movable end wall 36 there is a reciprocal thrust member or rod 42 that projects through the end wall of the casing 26 and extends substantially transverse to the blade 11, the thrust member 42 also preferably extending between the blade and the base 10, see Fig. 2. The rod 42 extends beyond or past the blade 11 and has an end portion that is slidably received and guided in a tubular member 43 that may be secured to the thermostat base 10. Adjustably screw threaded into the outer end of the tubular member 43 there is a thumb screw 44 the inner end of which serves as an abutment for the rod 42 to limit movement of the rod upon expansion of the bellows 34. After the end of rod 42 engages the stop screw 44 there is provision for lost motion and further expansion of the bellows 34 may be had through movement of the bellows end wall 36 against spring 40, providing that the force exerted by the thermostatic fluid is sufficient to overcome the spring. The thrust rod 42 is formed out of square stock, in the present instance, the member 42 having a square shank 45 that is slidably received and guided in an aperture in the inner end wall of casing 26. Externally of the casing 26 the shank 45 has a portion of reduced perimeter, as at 46, and formed out of the reduced portion 46 and facing toward abutment 44, as seen in Fig. 1, there is a V-shaped portion 47 having a knife edge 48 disposed toward and for engaging the opposed side of the blade 11. When the thrust rod 42 is moved outward by expansion of the bellows 34 the knife edge 48 will, after predetermined outward movement of the rod, engage and move the blade 11 to break contact between the blade and contact member 13, but the stop screw 44 is arranged to limit outward movement of the rod 42 to prevent blade 11 from being moved into engagement with the other contact member 12.

In order to control the operation of the heat motor 23 so that when the thermostatic blade 11 is dissatisfied the motor 1 will operate for relatively short time intervals, and will be cut-out for relatively long time intervals, I provide for having a portion of the resistance coil 30 energized when the motor 1 is cut-out to thereby prolong the cooling-down period of the heat motor. This portion of the resistance coil is preferably of such resistance that when the transformer voltage is impressed directly across the resistance portion, the heat generated thereby is of less magnitude than that generated by the portion in series with contact 13 and relay 18. To this end the coil 30 may be connected to the transformer secondary 8 by a lead wire 50 which, in the drawing, is shown connected to the lead wire 16, the resistance coil 30 thus being in shunt or parallel circuit with the thermostatic blade 11.

To determine or select the time period of operation of the motor 1 and the cut-out time period, a rheostat 51 may be provided for varying or selecting the desired coil portion to be energized during the cut-out period of the motor 1. The rheostat 51 may be of any suitable type and, as in the present instance, may be mounted or secured to the underside of the heat motor casing 26. The rheostat 51 may include a conductor member in the form of a slide bar 52 to which the lead wire 50 may be connected, and the slide bar may be rigidly secured to the casing 26 by screws, or by other suitable means. The slide bar 52 may be spaced from the casing 26 by tubular spacer members 53 through which the screws may extend and screw thread into the casing. Secured to the underside of the casing 26, in relative spaced relation, there may be a plurality of contact or terminal members 54, and slidably supported on the slide bar 52 there may be a manually operable contact member 55 for cooperation with the contact members 54. Each of the contacts 54 may be connected by a wire 56, or other current conducting means, to the resistance coil 30, the wires 56 being connected to the coil 30 at spaced intervals along its length. It will now be apparent that by means of the rheostat 51 a desired portion of the coil 30 may be energized to generate predetermined heat for heating the thermostatic fluid. If the rheostat 51 is set so that more heat is generated by the coil 30 on the "off" phase of motor 1, the time period between engagement and disengagement of the blade 11 and contact member 13 will be reduced and the time period of cooling-down of the heat motor 23, to permit engagement between the blade 11 and contact 13, will be increased.

In order that the shunt circuit of the coil 30 will be closed only on disengagement of the blade 11 and contact 13, I provide a switch 57 in the lead wire 50 and operate the switch by the heat motor 23. The switch 57 may comprise a pivotal switch arm 58 and a contact member 59 which may be mounted on the base 10 below the thrust rod 42. The pivotal switch arm 58 may extend longitudinally of the switch blade and an upper end portion thereof may be positioned for abutment by the outwardly facing shoulder, as at 60, provided between the shank 45 and the reduced portion 46 of rod 42. The upper end portion of the switch arm 58 is bent or rounded so as to provide a convex surface for engaging the shoulder 60 to reduce friction between the parts. At its lower end the switch arm 58 carries a contact member 61 for cooperation with the contact member 59, the latter contact member preferably being a screw adjustably screw threaded into a supporting member or bracket 62 that may be rigidly secured to the base 10. The switch arm 58 and its cooperating contact member 59 are arranged such that as the thrust rod 42 moves outward to break contact between blade 11 and contact member 13, the switch arm 58 is pivoted in a direction to make contact with contact member 59.

The operation of the herein described system in connection with controlling the operation of a stoker is as follows: When the thermostatic blade 11 becomes dissatisfied, or calls for heat, it will move into engagement with the contact member 12 which will close the circuit of the relay 18 which will be energized to attract switch 21 and close the circuit of the stoker motor 1. The circuit of the relay 18 is as follows: From the transformer secondary 8 via lead wire 17, contact member 12, blade 11, relay 18 and from the relay 18 via lead wire 16 back to the transformer secondary 8. Additional heat will now be supplied by operation of the stoker to the room or other enclosed space to be heated and when the thermostat blade becomes satisfied it will disengage from contact member 12 to stop the further supply of heat by opening the circuit of and stopping the motor 1. The thermostatic blade 11 will then engage contact member 13 which will energize the relay 18 and complete the circuit to the motor 1 through the resistance coil 30, current flowing from the transformer secondary 8 via lead wire 17, lead wire 32, resistance coil 30, lead wire 31, contact member 13, blade 11, relay 18 and lead wire 16 back to the transformer secondary 8. The resistance coil 30 will then generate heat which will drive volatilized fluid into the bellows 34 and expand the bellows, moving thrust rod 42 outwardly. Upon predetermined outward movement of the thrust rod 42 it will engage and move blade 11 out of engagement with contact 13 opening the circuit of the motor 1. Movement of the blade 11 into engagement with contact 12 by the heat motor 23 is prevented by the stop member 44. Movement of the blade 11 out of engagement with the contact member 13 opens the circuit at this point to the resistance coil 30, but outward movement of the thrust member 42 also closes switch 57 which closes a circuit through a portion of the coil 30, the length of the coil employed, and therefore the heat generated, being determined by the rheostat setting. After the blade 11 has been moved out of engagement with the contact member 13 it is held out of engagement with the contact 13 for a period of time because of the heat holdover of the thermostatic fluid, which holdover is enhanced by the heat insulating casing 26. As the thermostatic fluid of the heat motor cools, the bellows 34 will contract, moving rod 42 which will permit blade 11 to again contact the contact member 13 and start motor 1 providing, of course, that the blade 11 is still satisfied to the extent that it will follow the retracting rod and move through the necessary distance to engage the contact member 13. Also, as the thrust rod 42 is retracted, the switch arm 58 will be permitted to pivot by gravity out of engagement with its cooperative contact member 59, opening the shunt circuit of the resistance coil 30. It will thus be seen that the blade 11, when satisfied, will close the circuit of motor 1 for a relatively short time period and that the heat motor 23, under the control of blade 11, will periodically open the circuit of motor 1 for relatively long time periods.

While I have herein described my control device in connection with a heating system, it is to be understood that my device is adapted for use in any system in which under certain conditions it is desired to operate a motor for relatively long time intervals and under certain other conditions to operate the motor for relatively short time periods.

As previously mentioned, the switch 57 controlling the shunt circuit of the resistance coil 30 will provide for a saving of electrical energy because when the blade 11 is cooperating with the contact 12, the switch 57 will be open and the resistance coil 30 will be completely deenergized, or will not be generating any heat. During the time period when the blade 11 is dissatisfied, that is, when it is cooperating with contact 12, the heat motor 23 will cool down to, or approach the temperature of the ambient air, with the result that when the blade again becomes dissatisfied and cooperates with contact 13, the initial heating-up period of the heat motor will be longer than subsequent heating-up periods, but obviously this condition is not of a serious nature. However, this condition may be obviated, if desired, by connecting the resistance coil 30 to the transformer secondary 8 so that a portion of the coil will be energized during the period when the blade 11 is dissatisfied. Or in other words a portion of the resistance coil 30 may be at all times in closed circuit with the transformer secondary 8 and this arrangement will, of course, eliminate the switch 57. But as pointed out above, if the switch 57 is eliminated additional current will be used in operating the heat motor 23.

The device 1 herein referred to as a motor may, within the scope of my invention, be any electrically energized or actuated means such, for example, as a power means or a signal (either audible or visual).

What I claim and desire to secure by Letters Patent of the United States is:

1. In a control system, a heat motor for controlling an electric circuit to be made and broken, means operable automatically and controlling energization of said heat motor, and heater means rendered operable upon deenergization of said motor for increasing the time period during which the circuit will be open.

2. In a control system for controlling the operation of an electrically operated means, switch means operable to control the electrically operated means, a periodically energized heat motor cooperable with said switch means to control the electrically operated means, and means for determining solely the time period of cooling of the heat motor thereby to determine the time period of deenergization of the electrically operated means.

3. A control for a heating system having electrically operated means controlling supply of heat to an enclosed space, an electrically operated heat motor, a thermostatic blade operable when the temperature of the enclosed space reaches a predetermined temperature to close the circuit of the electrically operated means and the circuit of the heat motor, said heat motor being operable to move said blade to open the circuit of the electrically operated means and the circuit of said heat motor, and heating means for heating said heat motor upon deenergization of said heat motor thereby to prolong the rate of cooling of said heat motor so as to cut-out the electrically operated means for a relatively long time interval.

4. A control for controlling the circuit of an electrically operated means comprising, means responsive to a fluid characteristic and operable to control said circuit, a temperature responsive means for controlling said circuit, one of said controlling means being operable to close said circuit and the other of said controlling means being operable to open said circuit, a heating means for said temperature responsive means, and a second heating means for said temperature responsive means, said second-named heating means being energized upon deenergization of said first-named heating means thereby to prolong the cooling of said temperature responsive means when said circuit is open so that said circuit will be open for a relatively long time period.

5. A control for controlling the circuit of an electrically operated means comprising, means responsive to a fluid characteristic and operable thereby to control said circuit, a heat motor including a temperature responsive element operable to move said responsive means to control said circuit, one of said controlling means being operable to close said circuit and the other of said controlling means being operable to open said circuit, an electrically energized heating means for heating said temperature responsive element and operable upon deenergization of said heat motor thereby to prolong the cooling of said temperature responsive element, and a rheostat cooperable with said heating means for varying the rate of cooling of said temperature responsive means.

6. A control for controlling the circuit of an electrically operated means comprising, means responsive to a fluid characteristic and operable thereby to control said circuit, a heat motor including a temperature responsive element operable to move said responsive means to control said circuit, one of said controlling means being operable to close said circuit and the other of said controlling means being operable to open said circuit, a heating means for heating said temperature responsive element and operable upon deenergization of said heat motor thereby to prolong the cooling of said temperature responsive element, and heat insulating means enclosing said temperature responsive element and said heating means.

7. A control system comprising a movable condition responsive means, a controlled device, said device being energized on movement of said responsive means in one direction, said device being energized on movement of said responsive means in the opposite direction, power means energized on movement of said responsive means in said opposite direction, said power means acting upon energization to move said responsive means to deenergize said controlled device and said power means.

8. A control system comprising a movable condition responsive means, a controlled device, said device being energized on movement of said responsive means in one direction, said device being energized on movement of said responsive means in the opposite direction, power means energized on movement of said responsive means in said opposite direction, said power means acting upon energization to move said responsive means in said one direction to deenergize said controlled device and said power means, and means to stop the movement of said responsive means by said power means short of reenergization of said controlled device.

9. A control system comprising a movable condition responsive means, a controlled device, said device being energized on movement of said responsive means in one direction, said device being energized on movement of said responsive means in the opposite direction, a heat responsive power means, means to transmit movement from said power means to said responsive means, means to supply heat to said power means, and means confining the heat supplied to said power means to control the cooling of said power means upon decrease of heat supply to said power means, operation of said responsive means in said opposite direction actuating said heating means to supply heat to said power means, said power means acting upon predetermined heat input by said supply means to move said responsive means to deenergize said controlled device and to decrease the supply of heat by said heating means, said controlled device being reenergized by movement of said responsive means in said opposite direction upon predetermined cooling of said power means.

10. A control system comprising a movable condition responsive means, a controlled device, said device being energized on movement of said responsive means in one direction, said device being energized on movement of said responsive means in the opposite direction, a heat responsive power means, means to transmit movement from said power means to said responsive means, means to supply heat to said power means, means confining the heat supplied to said power means to control the cooling of said power means upon decrease of heat supply to said power means, operation of said responsive means in said opposite direction actuating said heating means to supply heat to said power means, said power means acting upon predetermined heat input by said supply means to move said responsive means to deenergize said controlled device and to decrease the supply of heat by said heating means, said controlled device being reenergized by movement of said responsive means in said opposite direction upon predetermined cooling of said power means, and means controlling the time period of cooling of said power means.

11. A control system for controlling the operation of a fuel stoker for a heating apparatus comprising a contact member, a thermostatic element responsive to the temperature of a space to be heated and cooperable with said contact member to control operation of the stoker, said element when satisfied engaging said contact member to increase the fuel input by said fuel stoker by an amount sufficient to maintain combustion, a heat motor energized by engagement of said contact member by said element and operable to move said element out of engagement with said contact member to decrease the fuel input of the stoker, and means for determining the time period of cooling of said heat motor so that said element and said contact member will be in engagement for a predetermined relatively short time period and will be out of engagement for a predetermined relatively long time period.

12. A control system for controlling the operation of a fuel stoker of a heating apparatus comprising a contact member, a thermostatic element responsive to the temperature of a space to be heated and cooperable with said contact member to control operation of said stoker, said element when dissatisfied moving in one direction and engaging said contact member to increase the fuel input by the stoker by an amount sufficient to maintain combustion, a second contact member, said element when satisfied moving in the opposite direction and engaging said second-named contact member to increase the fuel input by the stoker by an amount sufficient to maintain combustion, a heat motor energized by engagement of said element with said second-named contact member and operable to move said element out of engagement with said second-named contact member, and heating means for determining the time period of cooling of said heat motor so that said element will be in engagement with said second-named contact member for a predetermined relatively short time period and will be out of engagement with said second-named contact member for a predetermined relatively long time period.

13. A control system for controlling the operation of a fuel stoker of a heating apparatus comprising a contact member, a thermostatic element responsive to the temperature of a space to be heated and cooperable with said contact member to control operation of said stoker, said element when dissatisfied moving in one direction and engaging said contact member to increase the fuel input by the stoker by an amount sufficient to maintain combustion, a second contact member, said element when satisfied moving in the opposite direction and engaging said second-named contact member to increase the fuel input by the stoker by an amount sufficient to maintain combustion, a heat motor energized by engagement of said element with said second-named contact member and operable to move said element out of engagement with said second-named contact member, heating means for determining the time period of cooling of said heat motor so that said element will be in engagement with said second-named contact member for a predetermined relatively short time period and will be out of engagement with said second-named contact member for a predetermined relatively long time period, and stop means for limiting movement of said element by said heat motor to prevent movement of said element by said heat motor into engagement with said first-named contact member.

14. A control for controlling the circuit of an electrically operated means comprising, means responsive to a fluid characteristic for controlling said circuit, a heat motor controlled by said circuit and operable to control said responsive means, an electrical resistance means for heating said motor, a portion of said resistance means being in said circuit and operable to actuate the heat motor upon the closing of said circuit by said responsive means, means operable to energize a second portion of said resistance means to prolong the cooling of said heat motor upon movement of said responsive means by said heat motor to open said circuit.

15. In a control system, energizable means, responsive means for controlling said means and having an active position for energizing said means and movable away from said position, means operable to move said responsive means periodically upon movement thereof away from said active position, and means controlled by said periodic movement and acting periodically to energize said energizable means during the time said responsive means is away from said active position.

16. In a control system, an electrically operated controlling means, means responsive to a fluid characteristic and operable to control the circuit of said controlling means, a heat motor controlling said circuit, an electrical resistance means having two portions operable to heat said motor, said resistance means having one of said portions energized upon operation of said responsive means to deenergize said controlling means circuit, said one portion acting when energized to heat said heat motor to control said circuit, said resistance means having the other of said portions effective to prolong the cooling of said heat motor and the deenergization of said controlling means and energized by the circuit controlling operation of said heat motor.

ANDREW K. FOULDS.